Figure 1:
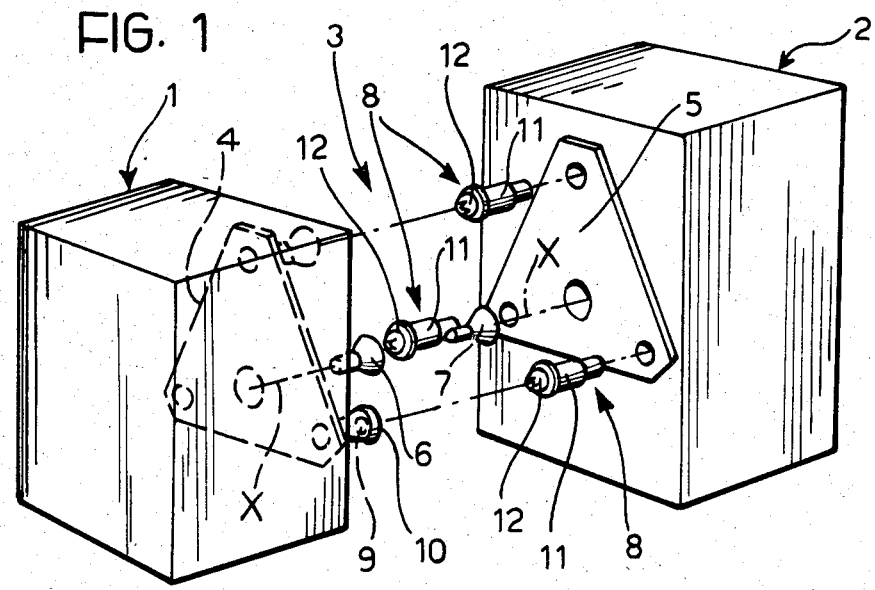

United States Patent [19]

Turci et al.

[11] Patent Number: 4,607,815

[45] Date of Patent: Aug. 26, 1986

[54] DOCKING SYSTEM FOR SPACE MODULES

[75] Inventors: Edmondo Turci; Guido Fubini, both of Turin, Italy

[73] Assignee: Aeritalia Societa Aerospaziale Italiana p.A., Turin, Italy

[21] Appl. No.: 601,820

[22] Filed: Apr. 19, 1984

[30] Foreign Application Priority Data

Apr. 19, 1983 [IT] Italy ................................ 67426 A/83

[51] Int. Cl.⁴ ................................................ B64G 1/64
[52] U.S. Cl. ..................................... 244/161; 114/249; 294/95; 403/381
[58] Field of Search ................... 244/161, 135 A, 115, 244/116; 114/249–250; 294/95; 403/381, 290, 248; 356/152–153; 250/203 R, 203 CT, 204, 215

[56] References Cited

U.S. PATENT DOCUMENTS

| 3,224,709 | 12/1965 | Blizard | 244/161 |
| 3,526,372 | 9/1970 | Paine | 244/161 |
| 3,722,710 | 3/1973 | Ixer et al. | 294/95 |
| 4,177,964 | 12/1979 | Hujsak et al. | 244/161 |
| 4,295,740 | 10/1981 | Sturges, Jr. | 244/161 |
| 4,431,333 | 2/1984 | Chandler | 244/161 |

Primary Examiner—Galen L. Barefoot
Attorney, Agent, or Firm—Sughrue, Mion, Zinn, Macpeak, and Seas

[57] ABSTRACT

A docking system for space modules includes a docking device having respective male and female coupling members carried by the two space modules. The coupling members are arranged to allow, after they have been brought into their coupled condition, relative rotation of the two modules about the axis of the docking device. The system further includes a plurality of connecting devices arranged to lock the two space modules in a precise relative position after the male and female members of the docking device have been brought into their coupled condition. Each of the said connecting devices comprises a coupling seat located in one of the two modules and a coupling shank carried by the other module and axially movable between a withdrawn inoperative position and an extended coupling position. This coupling shank has a head which is expandable within the said coupling seat to effect the connection between the two modules.

The mutual approach of the two coupling members into a centered condition is achieved with the aid of an infra-red indicator system.

13 Claims, 12 Drawing Figures

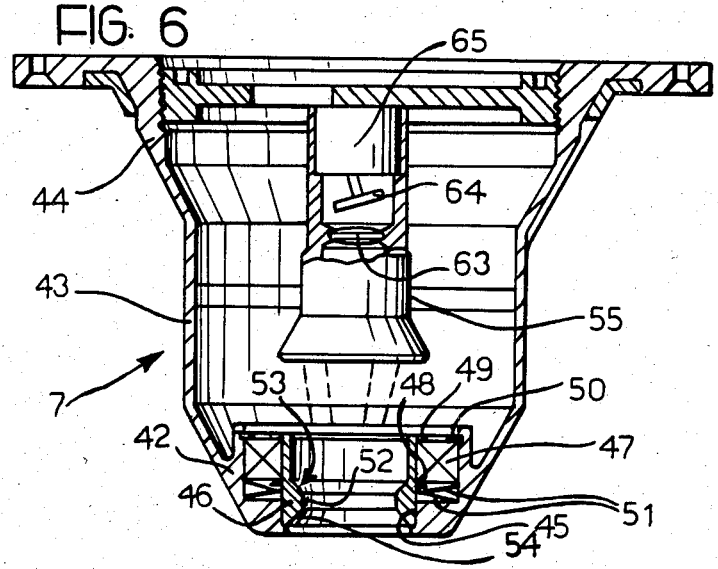
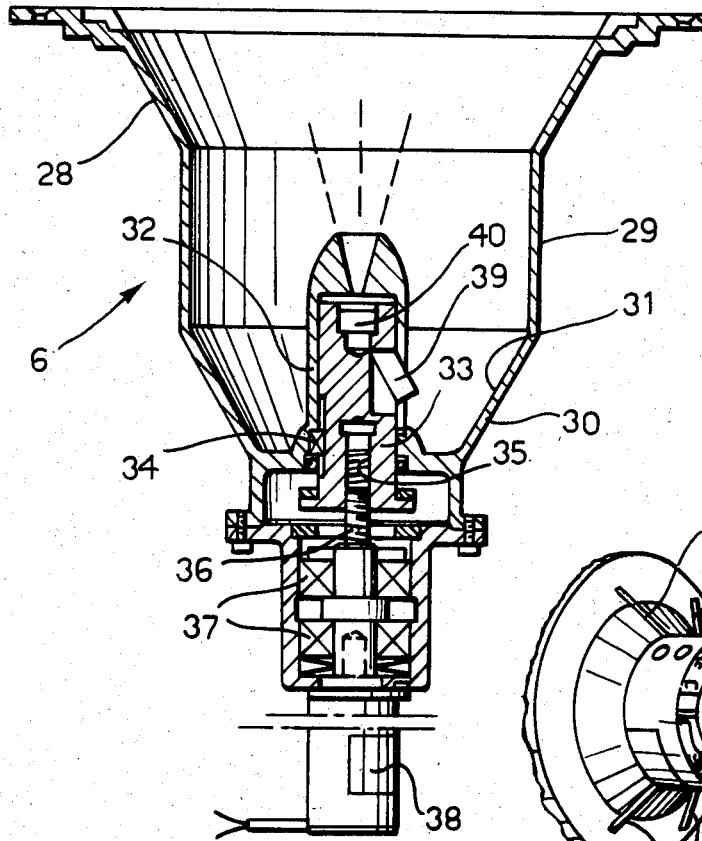
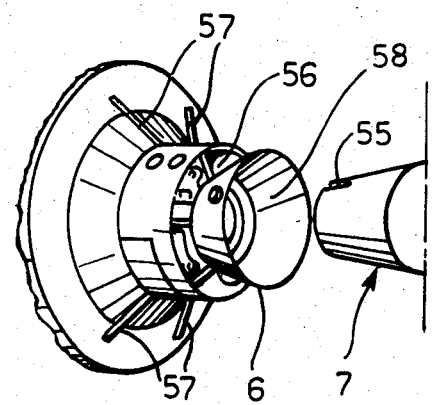

DOCKING SYSTEM FOR SPACE MODULES

The present invention relates to docking systems for space modules.

The object of the present invention is to provide a docking system of the said type which is particularly functional and reliable.

The main characteristic of the system according to the invention lies in the fact that it comprises:

a docking device including respective male and female coupling members carried by the two space modules, the coupling members being arranged to allow, after they have been brought into their coupled condition, relative rotation of the two modules about the axis of the docking device, a plurality of connecting devices arranged to lock the two space modules in a precise relative position after the male and female members of the docking device have been brought into their coupled condition, each connecting device comprising:

a coupling seat located in one of the two modules, and a coupling shank carried by the other module and movable axially between a withdrawn inoperative position and an extended coupling position, the coupling shank having a head which is expandible within the said coupling seat to form the connection between the two modules.

Preferably the expandable head of the coupling shank is substantially spherical and the coupling seat intended to cooperate with this expandable head has a corresponding shape.

In a preferred embodiment, the said coupling shank has a tubular body with, in correspondence with the head, a series of longitudinal slits which define a plurality of petal sectors which are resiliently outwardly flexible.

The inner faces of the petal sectors define a substantially conical surface converging towards the end of the shank, so as to allow the expansion of these petal sectors by means of a thrust member slidably mounted within these sectors.

An infra-red radiation indication system is also provided to facilitate the mutual approach into the centered condition of the two coupling members of the docking device.

Figure 2:
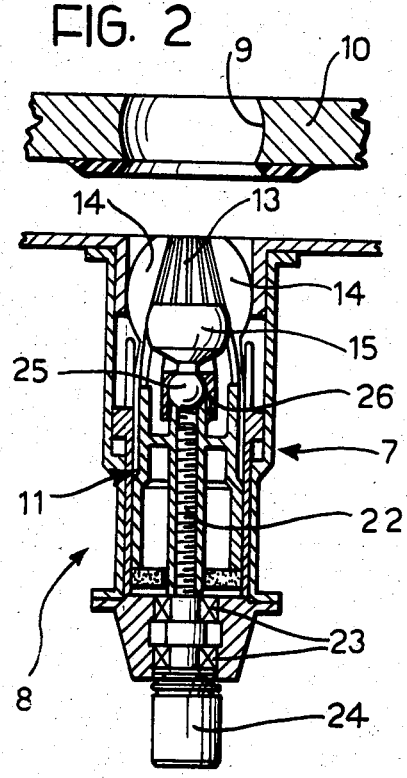
Figure 4:
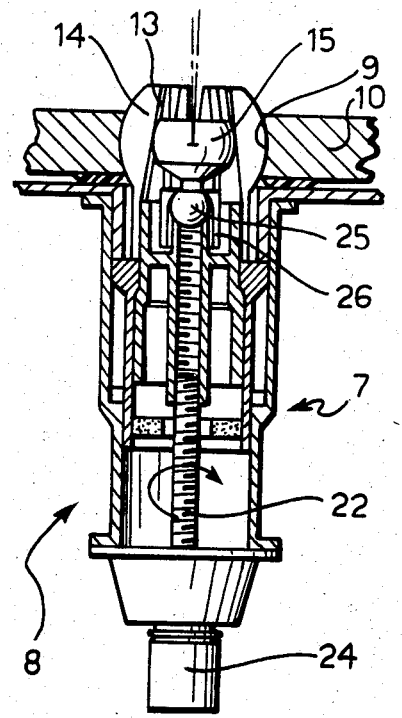
Figure 3:
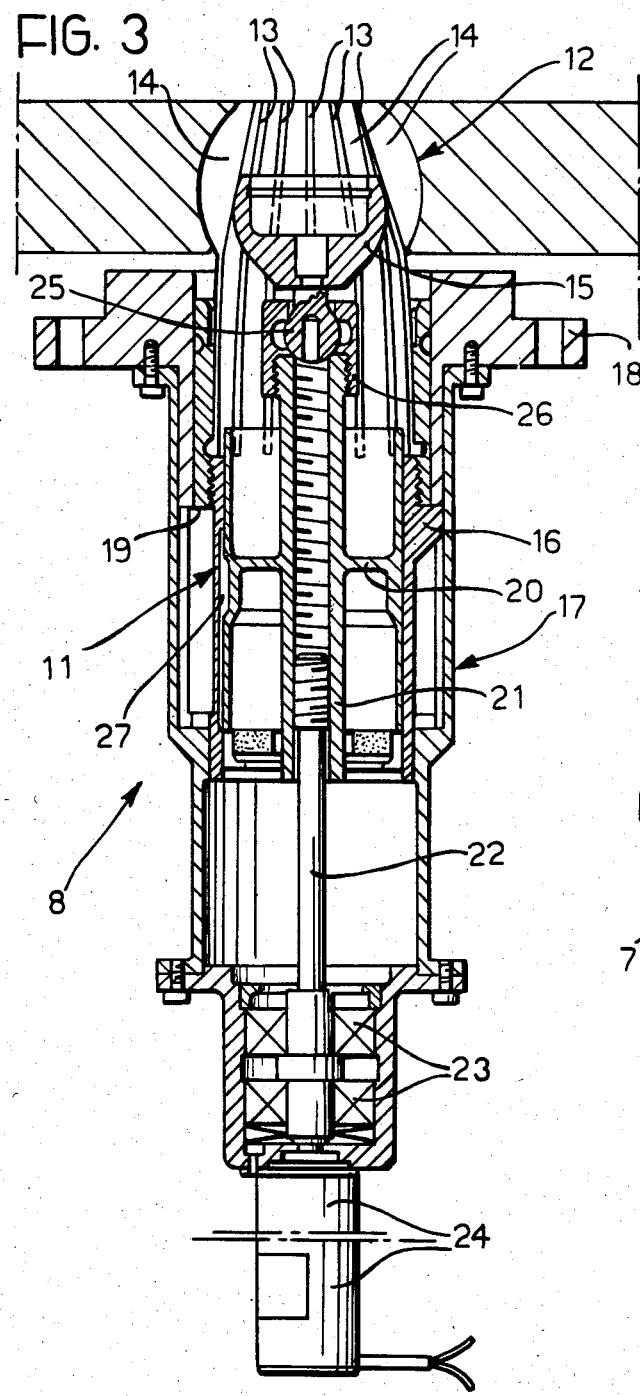
Figure 8:
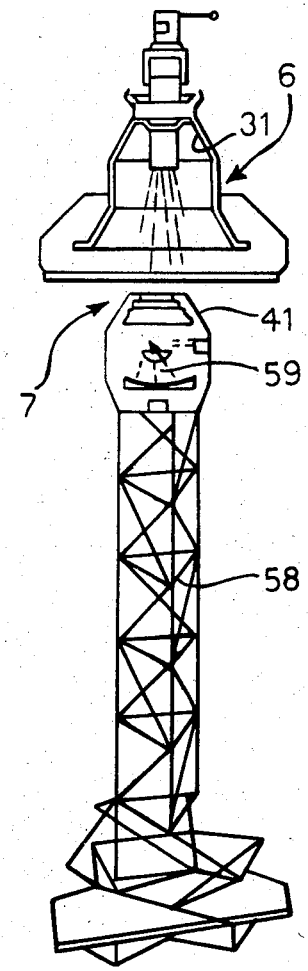
Figure 9:
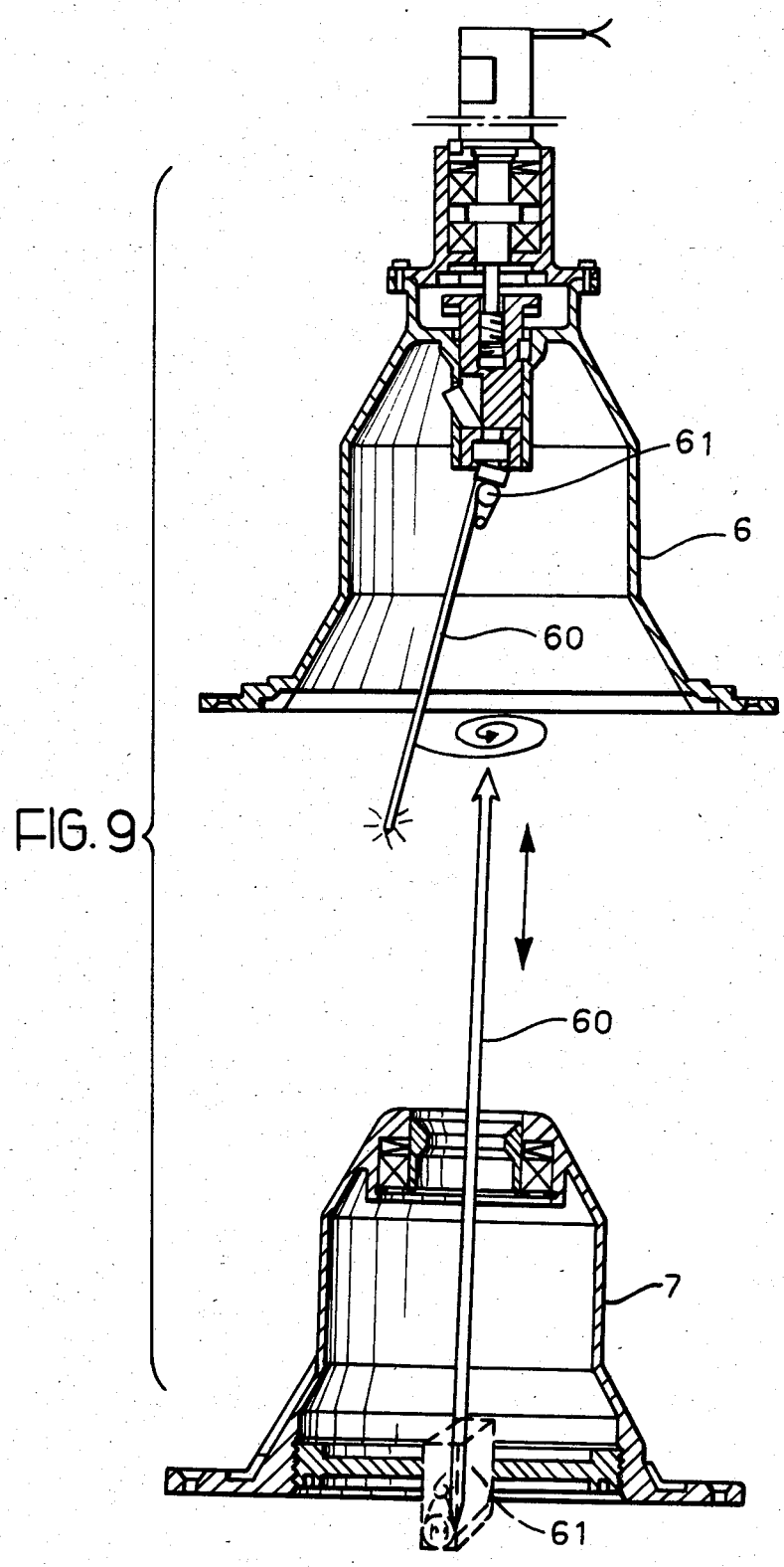
Figure 10:
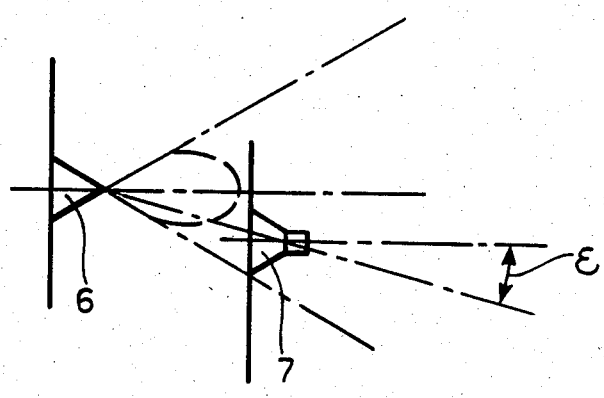
Figure 11:
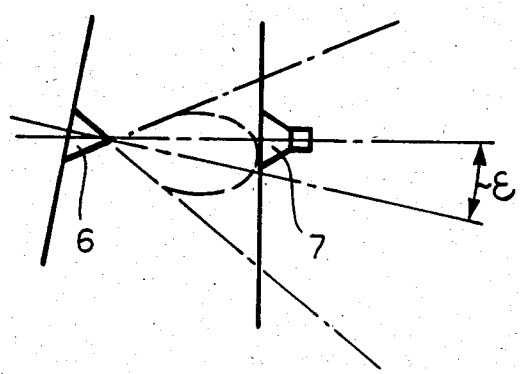
Figure 12:
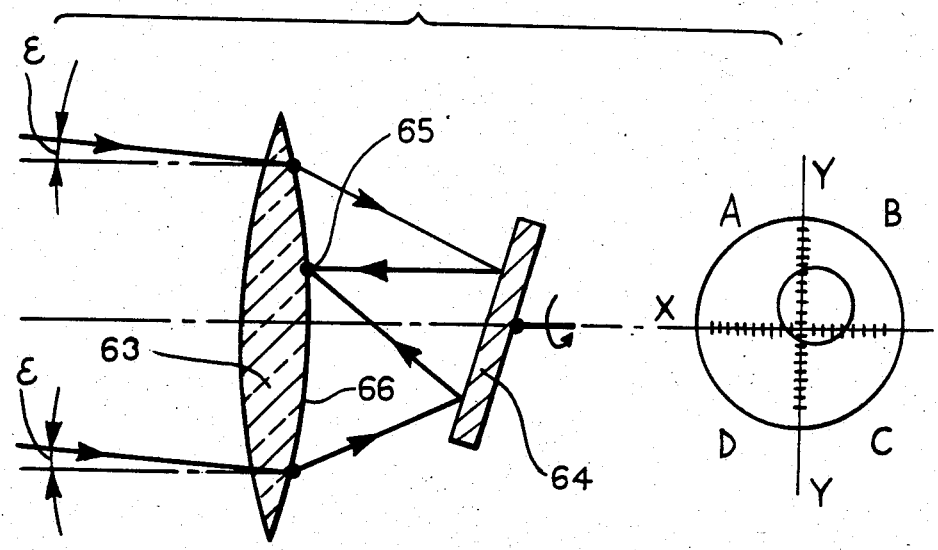

Further characteristics and advantages of the present invention will become apparent from the description which follows with reference to the appended drawings, provided purely by way of non-limiting example, in which:

FIG. 1 is a schematic and exploded perspective view of two space modules provided with a docking system according to the present invention, FIGS. 2 to 4 illustrate, in axial section, three different conditions of operation of one of the connecting devices forming part of the docking system illustrated in FIG. 1, FIGS. 5, 6 are schematical sectional views of two coupling members forming part of the docking device of the system illustrated in FIG. 1, FIG. 7 is a schematic perspective view of the docking device constituted by the two members illustrated in FIGS. 5, 6 according to a first embodiment, FIGS. 8, 9 illustrate a second and a third embodiment of the two coupling members of the docking device, and FIGS. 10 to 12 are schematic views illustrating the principle of operation of the infra-red indicator system with which the docking system according to the invention is provided.

FIG. 1 illustrates schematically and in perspective two space modules 1, 2 provided with a docking system 3 according to the invention.

In the embodiment illustrated, the various members constituting the docking system 3 are carried by two triangular plates 4, 5 fixed to the two space modules 1, 2 respectively.

The docking system 3 includes a docking device constituted by respective male and female coupling members 6, 7 carried by the two space modules.

As will be illustrated in detail below, the two coupling members 6, 7 are shaped so as to allow, after they have been brought into their coupled condition, relative rotation of the two space modules about the axis X—X of the docking device.

The docking system 3 further includes a plurality (three in the example illustrated) of connecting devices 8 arranged to lock the two space modules 1, 2 in a precise relative position after the male and female members 6, 7 of the docking device have been brought into their coupled condition. Each connecting device 8 comprises a coupling seat 9 which, in the example illustrated is defined by the internal cavity of an annulus 10 fixed to the module 1, and a coupling shank 11 carried by the space module 2. Each coupling shank 11 is movable axially between a withdrawn inoperative position and an extended coupling position, as will be explained in more detail below. Moreover, each coupling shank 11 has a head 12 which can expand within the corresponding seat 9 to effect the connection between the two space modules 1, 2.

A practical embodiment of a connecting device 8 is illustrated by way of example in FIGS. 2 to 4, which relate to three different conditions of operation of the device.

In the embodiment illustrated in these Figures, the coupling shank 11 is constituted by a tubular body having an expandable head 12 of substantially spherical shape arranged to cooperate with a seat 9 of corresponding shape. The coupling shank 11 has a tubular body with, in correspondence with the head 12, a plurality of longitudinal slits 13 which define a series of petal sectors 14 which are resiliently outwardly flexible. The inner faces of the petal sectors 14 define a substantially conical surface converging towards the end of the coupling shank 11, within which is slidable a thrust member 15 intended to effect the expansion of the petal sectors 14, as will be explained below.

The shank 11 is slidable axially by means of a splined coupling 16 within a casing 17 which is fixed to the space module 2 (see FIG. 1). In the example illustrated in the drawings, the casing 17 has a flange 18 for fixing it to the plate 5.

The casing 17 also has an annular shoulder 19 on its internal surface for cooperation with the shank 11 to define the position of maximum extension of the latter.

An auxiliary member 20 having a tubular coaxial shank 11 internally threaded spigot 21 is slidable within the coupling shank 11.

The internally threaded hole of the spigot 21 is engaged by one end of a screw 22 which is rotatably supported within the casing 17 by means of taper roller bearings 23 and which is driven by an electric motor 24 fixed to the casing 17. The end of the spigot 21 opposite the screw 22 is connected by a ball joint to the thrust member 15. More particularly, in the embodiment illustrated, the thrust member 15 has an end lug with a spherical head 25 which engages in a spherical seat formed in the end of the spigot 21 and is locked in this position by means of a cap element 26 screwed onto the spigot 21.

The operation of each docking device 8 is as follows: after the two coupling members 6, 7 of the docking device have been brought in to their coupled condition (in the manner which will be described in detail below) the two modules 1, 2 are rotated relative to each other about the axis X—X of the docking device to bring the coupling seats 9 into alignment with the coupling shanks 11. In this phase, each coupling shank 11 is in the position illustrated in FIG. 2. The electric motor 24 is then actuated to cause axial movement of the coupling shaft 11 towards its extended position. The rotation of the screw 22 in fact causes axial displacement of the auxiliary member 20 (a key 27 prevents relative rotation of the shank 11 and the member 20) and consequently this latter thrusts the coupling shank 11 by means of the member 15 which acts on the internal conical surface defined by the petal sectors 14 until the condition illustrated in FIG. 3 is reached. In this condition, the coupling shank 11 comes into contact with the abutment shoulder 19 whereby it is unable to move further outwardly relative to the flange 18. A supply current sensor for the electric motor 24 is provided so that when this current exceeds a predetermined level because of the difficulty of inserting the head 12 in the seat 9 due to non-perfect alignment, the sensor cuts off the supply to the electric motor, signalling the need for a more correct alignment. When the current falls below the said predetermined value the outward movement of the shank 11 is effected.

Once the condition illustrated in FIG. 3 has been reached the motor 24 is supplied with a higher current. Since the shank 11 can no longer move because of the abutment shoulder 19, the slidable member 20 moves relative to the shank 11, thrusting the element 15 towards the end of the head 12 and consequently causing the opening of the petal sectors 14 as illustrated in FIG. 4. When this condition is reached, the supply current for the motor 24 is further increased so as to apply a torque locking the member 15 between the petals 14. At this point the electric motor 24 is de-energised. When it is necessary to effect the undocking manoeuvre, the operations are repeated in the inverse manner to that explained above. The ball joint 25 allows small movements of adjustment of the petal sectors 14 upon introduction into the seat 9 in the case of non-perfect alignment.

FIGS. 5, 6 illustrate the two male and female coupling members 6, 7 constituting the docking device.

The female coupling member 6 has a flared body with a conical mouth 28 connected by means of a cylindrical portion 29 to a conical portion 30 the internal surface 31 of which constitutes one of the two conical coupling surfaces of the docking device. In correspondence with the bottom of the flared body there is a tubular spigot 32 within which an element 33 is slidable. A key 34 prevents rotation of the element 33 relative to the spigot 32. The element 33 has a threaded hole 35 within which is engaged a screw 36 which is rotatably supported within the body of the coupling member 6 by taper roller bearings 37. The screw 36 is driven by an electric motor 38 fixed to that body of the coupling member. The element 33 has three resilient tabs 39 (only one of which is visible in FIG. 5) which are equiangularly spaced. These resilient tabs are intended to cooperate with a corresponding seat of the coupling member 7 to achieve the locking of the two members 6, 7 in the coupled condition, as will emerge from the description below.

Finally, the coupling member 6 has an infra-red radiation transmitter 40 which will also be described below.

The male coupling member 7 has a conical end 41 with a conical coupling surface 42 for cooperation with the conical coupling surface 31 of the member 6. The conical end 41 is connected by a cylindrical portion 43 to a base conical portion 44.

The end portion 41 of the coupling member 7 has a hole 45 within which a bush 46 is rotatable with the interposition of a rolling bearing 47. The internal ring of the bearing 47 is axially fixed to the bush 46, being mounted between a resilient ring 48 fixed to the bush 46 and a shoulder 49 of the bush. The outer ring of the bearing 47 is mounted between a resilient ring 50 fixed to the body of the coupling member 7 and a pair of cup springs 51 which are interposed between the bearing 47 and the bottom of the bearing seat.

The internal surface of the bush 46 has a cylindrical portion 52 of smaller diameter connected to the ends by two conical portions 53, 54.

The coupling member 7 is finally provided with an infra-red radiation receiver 55 intended to cooperate with the transmitter 40 of the coupling member 6 the function of which will be explained below.

When it is necessary to carry out the docking of two coupling members 6, 7, these members are brought close to each other and into alignment (in one of the ways which will be explained below) and are then made to penetrate one into the other until the conical coupling surfaces 31, 42 contact each other. The surface 54 of the bush 46 engages the resilient tabs 39 causing their inward radial displacement and then their subsequent expansion and their engagement with the conical surface 53. The locking of the coupling is achieved by operation of the electric motor 38 so as to effect, through the screw 36 and the nut constituted by the element 33, an axial displacement of the latter towards the motor 38.

In the present specification the methods of acquisition and final approach of the two modules or space vehicles are not explained in that they are known per se, it being understood that for these phases radar systems and optical systems are used to bring the two space modules close to each other (several meters).

The method of docking itself, however, may be carried out, for example, by three different procedures which are described below with reference to FIGS. 7, 8, 9.

FIG. 7 relates to a first docking procedure which consists simply in moving the two space modules 1, 2 towards each other at slow speed until the two conical coupling surfaces 31, 42 are brought into contact with each other in the manner which has been described above. This procedure involves the use of a conical mouth 28 for the coupling member 6 of a relatively large width to take account of possible misalignments.

In this case, moreover, the two coupling members 6, 7 have reference means for the correct angular positioning of the two modules. These reference means may be constituted, for example, by a reference bar 55 carried by the coupling member 7 and arranged to cooperate with a reference groove 56 of the coupling member 6.

Preferably, moreover, the coupling member 6 is connected to the space module 1 by means of a series of shock absorber elements 57.

FIG. 8 relates to a second docking procedure which provides for the use of two coupling members 6, 7 of the type illustrated in FIGS. 5, 6. In this case, however, the coupling member 7 is mounted at the free end of a pylon 58 having a shock absorbing lattice structure, which is slidable axially on the space module 2 between a withdrawn position and an extended position.

The two space modules are thrust towards each other at slow speed with the pylon 58 in the extended position until the conical coupling surfaces 31, 41 come into contact with each other. The pylon 58 is able to damp the collision so as to achieve "soft" docking. Once the coupling condition has been reached, the correct relative angular position is achieved with the aid of reference means of the type illustrated in FIG. 7. Reference numeral 59 indicates the radar system mentioned above, necessary for the final approach phase which in this case is disposed at the end of the pylon 58. Once the aligned condition of the connecting devices 8 has been reached, the pylon 58 is withdrawn into the corresponding module to allow the operation of the devices 8.

FIG. 9 relates to a third docking technique. In this case the coupling member is also disposed at the top of a rectractable pylon similar to the pylon 58 of FIG. 8 (not illustrated in FIG. 9). Moreover each of the two coupling members 6, 7 is provided with a retractable probe 60 constituted, for example, by a rigid strip which may wind or unwind from a winding device 61 the free ends of the two probes 60 having hooks 62 for their mutual coupling.

According to this procedure, the two space modules are brought close to each other and stopped at a distance of a few meters (for example 3 meters). The pylon carrying the coupling member 7 is then extended, and the two probes 60 are also extended and then connected together. In the embodiment illustrated in FIG. 9, for example, the probe 60 carried by the coupling member 6 is rotated about the axis of the coupling member so as to describe conical surfaces of a diameter which gradually decreases until hooking of the two ends 62 is achieved. At this point the two probes 60 are retracted into the members 6, 7 and these latter are rotated relative to each other so as to bring the connecting devices 8 into the aligned condition. The reference for the correct angular position is achieved by forming the conical coupling surfaces with a section which is not exactly circular but slightly elliptical. Once the aligned condition has been reached, the pylon carrying the coupling member 7 is retracted and the connecting devices 8 are actuated to lock the two space modules in their correct docking position.

FIGS. 10 to 12 illustrate schematically the principle of operation of the infra-red radiation indicator system which is used as an aid during the final approach phase to achieve the correct aligned position of the two coupling members 6, 7. The structure of the infra-red radiation system is also illustrated schematically in FIGS. 5, 6. With reference to these Figures, the system comprises an infra-red radiation transmitter 40 which comprises an infra-red radiation source, an electronic supply and an objective for correction and adjustment of the radiation. The system also includes an infra-red radiation receiver 55 (see FIG. 6) carried by the coupling member 7 comprising an objective 63 and a mirror 64 inclined to a plane perpendicular to the axis of the coupling member and rotated about this axis by means of an electric motor 65.

As illustrated schematically in FIG. 12, the mirror 64 reflects radiation focussed at a point 65 on the internal surface 66 of the objective 63. The point 65 moves along a circle on the surface 66 because of the rotational movement of the mirror 64.

On the inner side of the objective 63 moreover, there are located four infra-red detectors which cover the four quadrants of the objective respectively.

The operation of the said infra-red radiation indicator system is explained below.

FIG. 10 illustrates a possible condition of misalignment of the two coupling members 6, 7. In these conditions, the axes of the two members 6, 7 are parallel and spaced apart whereby the receiver 55 sees the transmitter 40 with an angle of inclination $\epsilon$ relative to the axis of alignment. Because of this inclination (see FIG. 12) the circle described by the point 65 on the inner surface of the objective 66 is not concentric with this objective since it comprises arcs of different length in correspondence with the four quadrants. This means that the point 65 remains in each quadrant for a different time. This situation is detected by the fact that the electrical output voltage signal from each infra-red detector is proportional to the time during which the focussed radiation stays in each quadrant.

FIG. 12 illustrates schematically the four quadrants (indicated by the letters A, B, C and D) and the circle described by the focussed radiation in the case of a misalignment of the type illustrated in FIG. 10. If $V_A$, $V_B$, $V_C$ and $V_D$ are output voltage signals from the infra-red detectors corresponding to the four quadrants, the distances of misalignment $\epsilon_x$ and $\epsilon_y$ along the axes X and Y are proportional respectively to the following voltages:

$$V_x = \frac{V_A + V_D}{V_B + V_C} - 1$$

$$V_y = \frac{V_A + V_B}{V_C + V_D} - 1.$$

FIG. 11 illustrates another condition of misalignment in which the two axes of the coupling members 6, 7 are not parallel but intersect each other. In this case, the receiver 55 sees the transmitter 40 with an angle $\epsilon$ equal to zero, but the emission diagram of the infra-red radiation is rotated. It follows that the output signals from the infra-red detectors are lower than when the coupling members 6, 7 are aligned. The angle $\mu$ of misalignment is consequently formed by a comparison of the output signals from the infra-red detectors with a predetermined level corresponding to the aligned condition. This also means that the circle described by the point 65 on the objective has a lower luminosity than that which it would have in the aligned condition.

We claim:

1. A docking system for space modules comprising a docking device having male and female coupling members carried by the two space modules respectively, said coupling members having complementary conical surfaces for contacting each other in the coupled condition, complementary locking means adapted to secure said coupling members against axial separation while permitting relative rotation therebetween, said locking means comprising resilient retaining means carried by one of said coupling members and arranged to snap engage a corresponding seat member rotatably mounted in the other coupling member, reference means on said conical coupling surfaces for providing the correct alignment for said modules, and a plurality of connecting devices arranged to lock the two space modules in a precise aligned position wherein each connecting device comprises a coupling seat located in one of said modules and a coupling shank carried by the other module and axially moveable between a withdrawn inoperative position and an extended coupling position, the coupling shank having a head which is expandable within said coupling seat to form the connection between the two modules.

2. Docking system according to claim 1, wherein the expandible head of the said coupling shank is essentially spherical and the coupling seat intended to cooperate with this expandible head has a corresponding shape.

3. Docking system according to claim 1, wherein the coupling shank has a tubular body with, in correspondence with the expandible head a series of longitudinal slits defining a pluratlity of petal sectors which are resiliently outwardly flexible.

4. Docking system according to claim 3, wherein the inner faces of the sectors define a substantially conical surface converging towards the end of the coupling shank and in that a thrust member is movable axially between the said sectors to cause the expansion of the sectors.

5. Docking system according to claim 4, wherein the coupling shank is slidable in a cylindrical casing fixed to the corresponding space module, and in that the thrust member is connected to an auxiliary control member mounted in its turn in a slidable manner within the coupling shank.

6. Docking system according to claim 5, wherein the auxiliary slidable member has a coaxial tubular spigot which is internally screw-threaded and in that the fixed casing is supported rotatably by a screw having one end engaged in the spigot and the opposite end controlled by an electric motor fixed to the casing.

7. Docking system according to claim 6, wherein the fixed casing has an end-of-stroke stop arranged to cooperate with the coupling shank to limit the maximum position of extension of the latter.

8. Docking system according to claim 5, wherein the thrust member is connected to the slidable auxiliary member by means of a ball joint.

9. Docking system according to claim 1, wherein the said resilient retaining means are carried by an element which is axially slidable relative to the body of the corresponding coupling member, and in that the latter has an electric motor and a screw-nut system for effecting the axial displacement of the slidable member so as to allow the locking of the resilient means in the engaged condition of the said seat. .

10. Docking system according to claim 1, wherein the two conical coupling surfaces have a slightly elliptical section.

11. Docking system according to claim 1, wherein the two coupling members have respective docking probe of which at least one is retractable and able to connect with the other probe in its extended condition and subsequently to retract to allow the final approach and contact of the two coupling members.

12. Docking system according to claim 1, wherein one of the two coupling members is carried by a shock absorber pylon movable axially between an extended condition and a withdrawn condition.

13. A docking system for space modules comprising a docking device including male and female coupling members carried by the two space modules respectively, said coupling members being arranged to allow relative rotation of the two modules about the axis of the docking device after they have been brought into coupled position, a plurality of connecting devices arranged to lock the two space modules in a precise relative position after the male and female members of the docking device have been brought into coupled position, each connecting device comprising a coupling seat located in one of the two modules and a coupling shank carried by the other module and axially moveable between a withdrawn inoperative position and an extended coupling position, the coupling shank having a head which is expandable within the coupling seat to form the connection between the two modules, said two coupling members having an infrared radiation indicator system for allowing the mutual coming together in an aligned condition, the infrared radiation indicator system including an infrared radiation transmitter device carried by one of the two coupling members, an infrared radiation receiver device carried by the other coupling member and including an objective, a mirror slightly inclined to a plane perpendicular to the axis of the objective and rotatably driven about this axis so as to reflect the focused infrared radiation onto a point on the internal surface of the objective which describes a circle on this surface upon rotation of the mirror and for infrared detectors positioned according to the four quadrants and corresponding to the internal surface of the objective.

* * * * *